Nov. 27, 1956 D. R. McKUNE 2,771,981
UNSCRAMBLER CONSTRUCTION
Filed March 19, 1951 2 Sheets-Sheet 2
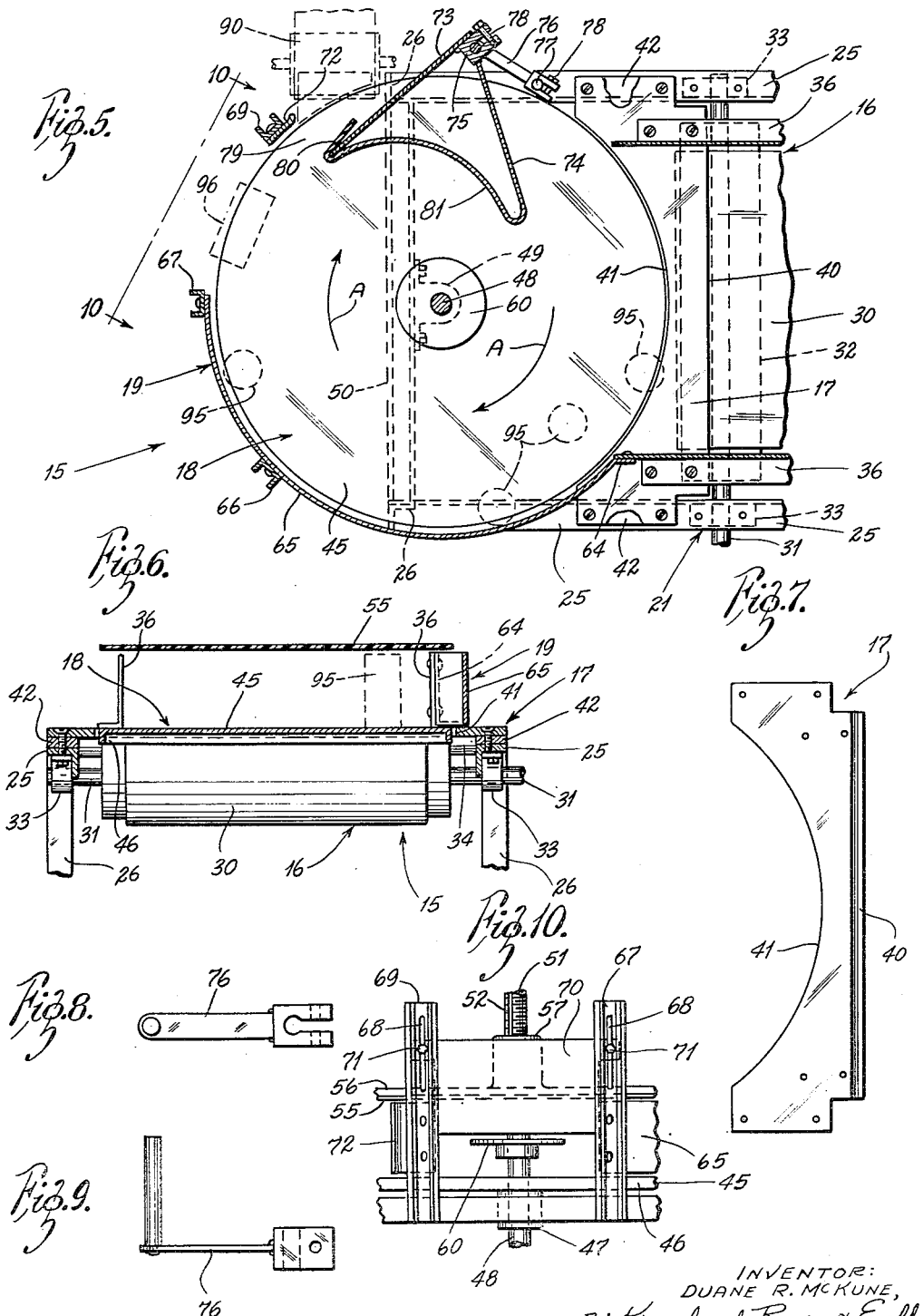
INVENTOR:
DUANE R. McKUNE,
BY Kingsland, Rogers & Ezell
ATTORNEYS

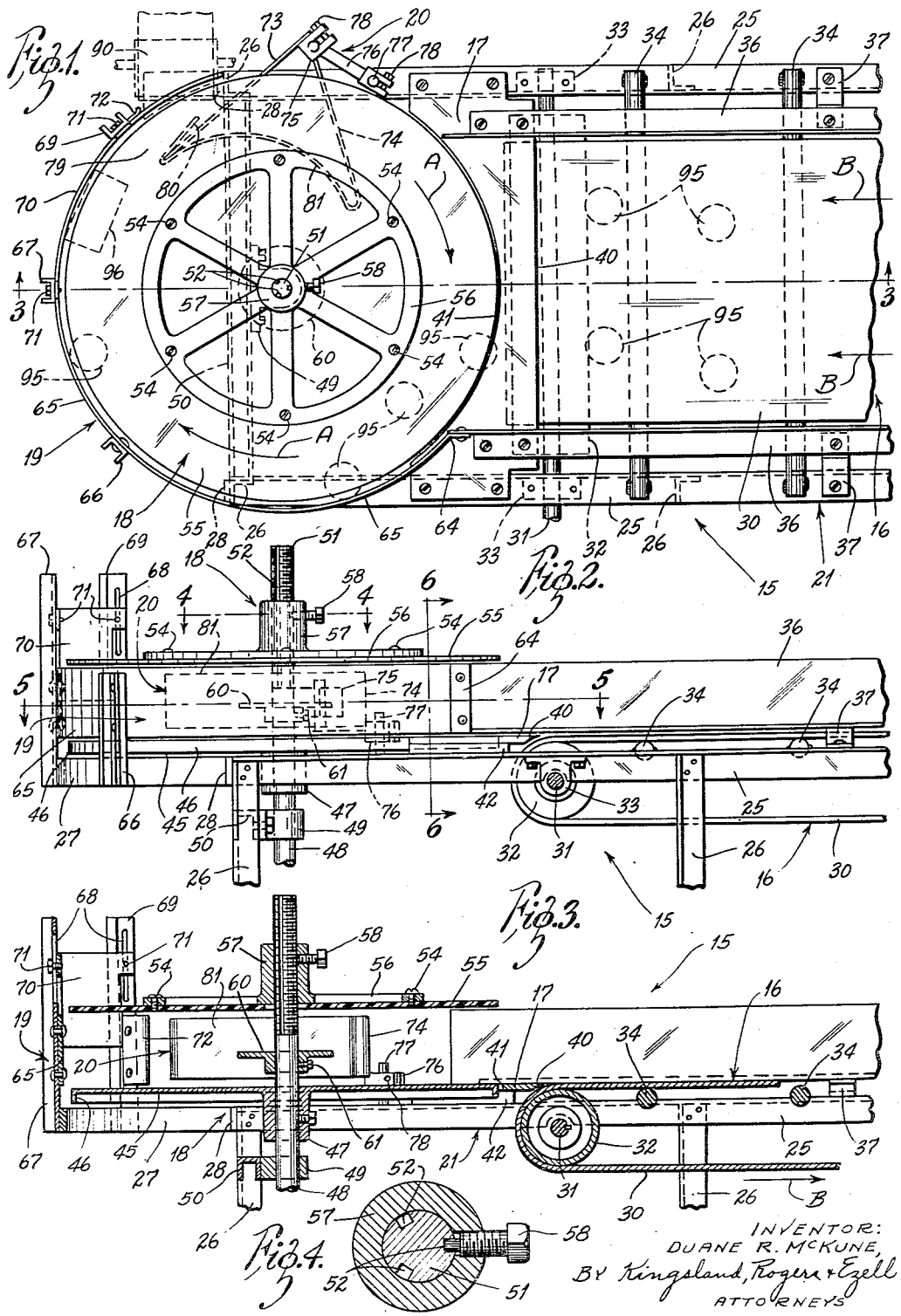

United States Patent Office 2,771,981
Patented Nov. 27, 1956

2,771,981

UNSCRAMBLER CONSTRUCTION

Duane R. McKune, Dunedin, Fla., assignor, by mesne assignments, to Brogdex Company, Orange County, Fla., a corporation of Florida Application March 19, 1951, Serial No. 216,386

11 Claims. (Cl. 198—30)

The present invention relates generally to unscrambler constructions, and more particularly to an unscrambler construction for receiving masses of cans or the like and for displacing them in single file relation onto a belt conveyor or other receiver.

In brief, the present unscrambler construction contemplates a rotating disc or table disposed adjacent the discharge end of a belt type feed conveyor, there being a stationary transition plate disposed between the feed conveyor and the table for initially receiving the cans in masses or otherwise for transfer to the latter. A stationary retaining wall is provided around a portion of the table to prevent the cans from being displaced therefrom in an undesirable manner due to centrifugal force. An adjustable gate in the retaining wall, however, permits the ejection of cans which may have been inadvertently overturned before reaching the rotating table. A deflecting member overhangs a portion of the table and may be adjustably positioned relative to the retaining wall to form therewith a discharge channel through which the unscrambled articles may pass in single file onto a second belt conveyor or the like. Another portion of the deflecting member serves to deflect cans which are not in position to be included in the single file row so that they may be carried once more around the table for another pass at the discharge channel. A second disc member is disposed above the table and is adjustably spaced therefrom so as to prevent tipping or overturning of the cans or the like while on the table. This second disc is preferably constructed of transparent material and rotates with the table.

Therefore, an object of the present invention is to provide a novel unscrambler construction which receives masses of cans or similar articles, maintains those received in upright positions against overturning, permits those received in overturned positions to be released ahead of normal discharge, and disposes those in upright positions in single file between discharge guides.

Another object of the invention is to provide a novel unscrambler construction which incorporates means for preventing cans or the like from being overturned during the unscrambling action which allows continuous inspection of the articles.

Another object is to provide a novel unscrambler construction which incorporates an opening with an adjustable gate for releasing overturned cans or the like before they reach the discharge guides.

Another object is to provide a novel unscrambler construction for disposing can masses in single file which has a minimum number of individually moving parts, but which has high unscrambling capacity and is relatively inexpensive to construct and to maintain in operation.

The foregoing and other objects and advantages are apparent from the following description taken with the accompanying drawings, in which:

Fig. 1 is a plan view of an unscrambler construction incorporating the teachings of the present invention, a feed belt assembly for the construction and a discharge belt being broken away for conservation of space;

Fig. 2 is a side elevational view thereof, the support being broken away as immaterial to the present disclosure;

Fig. 3 is a vertical longitudinal cross-sectional view taken substantially along the line 3—3 of Fig. 1;

Fig. 4 is an enlarged horizontal cross-sectional view taken substantially along the line 4—4 of Fig. 2;

Fig. 5 is a horizontal cross-sectional view taken generally along the line 5—5 of Fig. 2;

Fig. 6 is a vertical transverse cross-sectional view taken generally along the line 6—6 of Fig. 2;

Fig. 7 is a bottom plan view of a removed transition plate;

Fig. 8 is a bottom plan view of a removed deflector bracket;

Fig. 9 is a side elevational view of the removed deflector bracket; and

Fig. 10 is a fragmentary side elevational view taken generally from the line 10—10 of Fig. 5, showing details of a gate.

Referring to the drawings more particularly by reference numerals, 15 indicates generally an unscrambler construction built in accordance with the teachings of the present invention. Broadly, the present unscrambler construction 15 includes a feed belt assembly 16, a transition plate 17, a rotating assembly 18, an upright can retaining and overturned can release assembly 19, a deflector assembly 20, and a supporting frame 21.

The supporting frame 21, preferably constructed of angle iron as clearly shown in Figs. 1–3, 5 and 6, includes parallel horizontal rail members 25 secured to and supported by vertical struts 26. An arcuate horizontal strap member 27 is secured to two end struts 26 by means of lugs 28 which are welded to both the member 27 and the struts 26, and, in effect, joins the rail members 25.

The feed belt assembly 16 comprises a movable continuous conveyor belt 30 supported on two drums or rollers 32, only one of which is shown. The illustrated drum 32 is secured to a driven shaft 31 which is connected to a source of power (not shown). The shaft 31 is supported by trunnion bearings 33 secured to the lower surfaces of the horizontal flanges of the rail members 25, the upper run of the belt 30 being somewhat above the rail members 25. The upper run of the belt 30 is further supported by transversely extending bars 34 secured, as by welding, to the upper surfaces of the rail members 25. Parallel retaining guides 36 are disposed adjacent the side edges of the upper run of the belt 30 and are supported from the rail members 25 by means of appropriate brackets 37.

The transition plate 17, shaped as clearly shown in Fig. 7, includes a straight edge 40 of concave cross section disposed adjacent the conveyor belt 30, as best shown in Figs. 1–3. An opposite edge 41 is arcuately shaped to conform to the peripheral edge of a disc-like table to be described. The transition plate 17 is supported on block members 42 resting on the rail members 25, being secured to the latter by suitable bolts, the block members 42 disposing the upper surface of the plate 17 at the level of the upper surface of the conveyor belt 30.

The rotating assembly 18 includes a disc-like table 45, the peripheral edge of which is disposed adjacent the edge 41 of the transition plate 17, the upper surface of the table 45 being at the same level as the upper surface of the plate 17. The table 45 may have a rim in the shape of a depending flange 46 for added strength and rigidity, and has a depending hub 47, by means of which it is mounted upon a vertical driven shaft 48, the lower portion of which is broken away. The shaft 48 is rotatable by conventional power means (not shown) and is in part supported by a trunnion bearing 49 mounted on a channel 50 extending between two of the struts 26. A substantial portion 51 of the shaft 48 adjacent the upper end thereof is threaded and, in addition, has three longitudinal slots 52 for a purpose to appear.

A disc 55, preferably of transparent plastic, is secured by screws 54 to a spider 56 having a threaded hub 57 engaging the threaded portion 52 of the shaft 48. Thus supported, the disc 55 is adjustably spaced from the table 45 and may be secured in appropriate adjusted position by means of the reduced end of a setscrew 58 engaging one of the slots 52, as best shown in Fig. 4. A guard flange 60 is mounted on the shaft 48 intermediate the table 45 and the disc 55 and is secured to the shaft 48 by means of a setscrew 61.

The assembly 19 comprises a vertical retaining plate 65 of arcuate shape disposed adjacent a peripheral portion of the rotating assembly 18 and supported by vertical channel segments 66 and 67 welded to the arcuate strap member 27. A receiving end 64 of the retaining plate 65 is appropriately connected to one of the retaining guides 36 of the feed belt assembly 16. It will be noted that the channel member 67 is longer than the channel member 66, and includes a slot 68 in the web of the extended portion, being thereby enabled to cooperate with a similar channel 69, also having a slot 68, to support a gate 70. The latter, formed as clearly indicated in Figs. 1–3 and 10 of the drawings, is adjustably retained by means of cap screws 71 inserted through the respective slots 68 and threadedly engaging apertures in the gate 70. The channel 69 also supports a stationary guide plate segment 72 having its free end bent outwardly away from the rotating assembly 18 to facilitate delivery of cans to a discharge belt or the like.

The deflector assembly 20 includes a straight plate member 73 and a bent plate member 74, shaped and joined as clearly shown in Figs. 1 and 5, both being secured, as by welding, to a clamp block 75 by means of which this welded structure is mounted on a deflector assembly bracket 76 constructed as clearly shown in Figs. 8 and 9 of the drawings. The bracket 76 is in turn mounted upon a vertical stub shaft 77 supported by one of the rail members 25. The deflector assembly 20, thus mounted, is adjustable to any desired position relative to the rotating assembly 18 and may be maintained in such position by tightening cap screws 78.

It will be noted that an end portion 80 of the bent plate member 74 is disposed at any angle to the straight plate member 73 and thus cooperates with the guide plate 72 to form a guide discharge channel 79 for the discharge of cans or the like in single file from the rotating assembly 18, as will be more fully described. It will further be noted that an arcuate section 81 of the bent plate member 74 is so disposed relative to the center of the rotating assembly 18 as continuously to approach the center of rotation when viewed in the direction of rotation, for a purpose to appear.

A discharge belt 90, shown in Figs. 1 and 5 in broken lines, does not constitute an element of the present invention and is shown merely as a typical conventional device for receiving cans or the like from the unscrambler construction 15.

Operation

When the present unscrambler construction 15 is in operation, power for rotating the shafts 31 and 48 is delivered by conventional means such as a motor and gearing (not shown). The rotating assembly 18 and the conveyor belt 30 are thus caused to move continuously in the directions indicated by the arrows A and B on the several figures of the drawing. Cans 95 or the like (Figs. 1 and 5) may be placed in masses or scattered upon the upper surface of the conveyor belt 30, thus to be advanced toward, and urged across, the transition plate 17 onto the upper surface of the rotating table 45. Upon being subjected to the rotational effect of the table 45, the cans move under centrifugal force outwardly and tend to align themselves against the retaining plate 65 and the gate 70 so as normally to be carried directly through the discharge channel 79. If, due to jamming as from overcrowding, any can 95 is prevented from entering the discharge channel 79, it will be guided by the arcuate section 81 of the deflector assembly 20 and carried inwardly toward the center of rotation so as to bypass the incoming mass of cans from the feed belt assembly 16. Such cans are thus carried completely around, remaining on the table 45 until they eventually enter the single file row of cans passing through the discharge channel 79.

The width of the discharge channel is, of course, adjustable by virtue of the aforementioned mounting structure of the deflector assembly 20. Thus, the unscrambler 15 may be adapted to accommodate various sizes of articles to be unscrambled. The transparent disc 55 is normally adjusted to a height which will permit free movement of the cans or the like on the table 45 but which will prevent the cans from overturning. The raised position of the gate 70 provides an adjustable opening for the centrifugal ejection of any can, such as 96, which may have overturned before reaching the table 45.

Clearly, there has been provided an unscrambler construction which fulfills the objects and advantages sought therefor. It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. An unscrambler construction comprising, in combination, a discharge channel, means for receiving cans or the like in masses for advancement toward the discharge channel, means for advancing the cans to the vicinity of the discharge channel, means for aligning at least a portion of the cans in single file during said advancement, means for releasing ahead of said discharge channel any cans fed to said unscrambler construction in overturned positions, means for deflecting any remaining cans from the vicinity of the discharge channel for readvancement to the vicinity thereof, and means for preventing overturning of cans or the like during unscrambling.

2. An unscrambler construction comprising, in combination, a discharge channel, means for receiving cans or the like in masses for advancement toward the discharge channel, rotatable means for advancing the massed cans to the vicinity of the discharge channel, said rotatable means being effective to displace massed cans toward the periphery thereof by centrifugal force, retaining means adjacent the periphery of the rotatable means for aligning at least a portion of the massed cans in single file during said advancement and as a result of said displacement, gate means in said retaining means for the discharge of overturned cans from the aligned group, and deflecting means disposed above a portion of the rotatable means for deflecting any remaining cans from the vicinity of the discharge channel for readvancement to the vicinity thereof, said discharge channel being defined by a portion of said retaining means and a portion of said deflecting means.

3. In an unscrambler construction, in combination, a rotatable table for receiving cans or the like in masses and advancing them both by rotation and by centrifugal displacement toward a discharge channel, means disposed in predetermined spaced relation above the table for preventing overturn of the cans during said advancement, an arcuate retaining member disposed adjacent a portion of the periphery of the table for retaining at least a portion of the cans in single file alignment during their approach to the vicinity of the discharge channel, and a deflecting member disposed above a portion of the table for deflecting any remaining cans from the vicinity of the discharge channel for subsequent readvancement to the vicinity thereof, said discharge channel being defined by portions of the retaining and deflecting members.

4. In an unscrambler construction, in combination, movable means for receiving cans or the like for unscrambling, a movable member disposed above said movable means, said movable member being substantially parallel to and co-extensive with said movable means, said movable member being spaced from said movable means a distance determined by the height of the cans or the like being unscrambled and cooperative with said movable means to prevent tipping of cans or the like being handled by said movable means, and means for moving said movable member in the same direction and at substantially the same speed as said movable means.

5. In an unscrambler construction, in combination, movable means for receiving cans or the like for unscrambling, a transparent movable member disposed above said movable means, said transparent movable member being substantially parallel to and co-extensive with said movable means, said transparent movable member being spaced from said movable means a distance determined by the height of the cans or the like being unscrambled and cooperative with said movable means to prevent tipping of cans or the like being handled by said movable means, and means for moving said transparent movable member in the same direction and at substantially the same speed as said movable means.

6. In an unscrambler construction, in combination, a rotatably mounted shaft, a table secured to said shaft for rotation therewith, and a transparent member secured to said shaft for rotation therewith, said transparent member being substantially parallel to and co-extensive with said table, said transparent member serving to prevent overturning of cans or the like supplied to the table.

7. In an unscrambler construction, a rotating assembly for displacing cans and the like, comprising a vertical rotatable shaft, a circular table fixed to the shaft for rotation therewith, and a disc-like member fixed to the shaft in predetermined spaced relation above the table for rotation therewith, said disc-like member being substantially co-extensive with said table.

8. In an unscrambler construction, a rotating assembly for displacing cans and the like, comprising a vertical rotatable shaft, a circular table fixed to the shaft for rotation in a horizontal plane therewith, a disc-like member disposed parallel with the table for rotation therewith, and means for adjustably securing the disc-like member to the shaft in a plurality of spaced positions above the table.

9. In an unscrambler construction, a rotating assembly for displacing cans and the like, comprising a vertical rotatable shaft, a circular table fixed to the shaft for rotation in a horizontal plane therewith, a disc-like member disposed parallel with the table for rotation therewith, and means for adjustably securing the disc-like member to the shaft in a plurality of spaced positions above the table, said means comprising a threaded connection of the disc-like member with the shaft, a plurality of longitudinal grooves in the shaft, and a movable device connected with the disc-like member for selectively engaging any of said grooves.

10. In an unscrambler construction comprising a circular rotatable table for displacing cans and the like toward a discharge channel, a deflecting assembly disposed above a portion of said table in adjustable horizontal spaced relation to a peripheral edge thereof, said assembly including a straight portion defining one side of said discharge channel and a portion having a concave arcuate surface for deflecting cans away from said discharge channel and generally toward the center of rotation of said table, said concave arcuate surface being disposed with one end closer than the other to the peripheral edge of the table and with said one end also advanced farther than the other against the direction of rotation of the table.

11. In an unscrambler construction comprising a circular rotatable table, a fixed arcuate member for retaining upright cans on the table, a fixed guide member, said members being disposed in arcuate spaced relation adjacent a peripheral portion of said table, each of said members extending vertically above the periphery of said table, and a second arcuate member extending arcuately between the fixed arcuate member and the fixed guide member, said second arcuate member being vertically adjustable relative to the periphery of said table and having a lower edge normally spaced from the top of the table to permit overturned cans to pass thereunder and off said table.

References Cited in the file of this patent

UNITED STATES PATENTS

| | | |
|---|---|---|
| 759,811 | Graham | May 10, 1904 |
| 1,277,183 | Bradenstein | Aug. 27, 1918 |
| 1,373,605 | Eberly | Apr. 5, 1921 |
| 1,416,763 | Thom | May 23, 1922 |
| 1,430,132 | Wilberts | Sept. 26, 1922 |
| 1,719,305 | Pardee | July 2, 1929 |
| 1,965,373 | FitzGerald | July 3, 1934 |
| 2,047,106 | Lidberg | July 7, 1936 |
| 2,176,659 | Mundy | Oct. 17, 1939 |
| 2,220,137 | Wilkinson | Nov. 5, 1940 |
| 2,437,721 | Barganz | Mar. 16, 1948 |
| 2,570,395 | Siegal | Oct. 9, 1951 |
| 2,582,007 | Christiansen | Jan. 8, 1952 |
| 2,620,065 | Boyce | Dec. 2, 1952 |
| 2,629,481 | Stover | Feb. 24, 1953 |
| 2,642,173 | Wehmiller | June 16, 1953 |